United States Patent [19]

Huff

[11] Patent Number: 4,530,065
[45] Date of Patent: Jul. 16, 1985

[54] HYBRID DIGITAL-ANALOG MEASUREMENT AND CONTROL SYSTEM

[75] Inventor: Curtis M. Huff, Clifton, N.J.

[73] Assignee: Henderson Industries, West Caldwell, N.J.

[21] Appl. No.: 476,110

[22] Filed: Mar. 17, 1983

[51] Int. Cl.³ .................... G06F 15/46; G05B 7/00
[52] U.S. Cl. .................... 364/600; 364/139; 364/466; 340/347 SH
[58] Field of Search ............ 364/139, 466, 567–568, 364/570–571, 579, 581, 600–602; 340/347 SH

[56] References Cited

U.S. PATENT DOCUMENTS

| | | | |
|---|---|---|---|
| 4,028,534 | 6/1977 | Tucker | 364/600 X |
| 4,034,818 | 7/1977 | Matilainen | 364/568 X |
| 4,054,784 | 10/1977 | Ricciardi et al. | 364/479 |
| 4,111,336 | 9/1978 | Ward et al. | 222/58 |
| 4,141,065 | 2/1979 | Sumi et al. | 364/602 X |
| 4,149,256 | 4/1979 | Sumi et al. | 364/602 |
| 4,155,115 | 5/1979 | Wilske | 364/600 X |
| 4,336,853 | 6/1982 | Hirano | 364/567 X |
| 4,401,981 | 8/1983 | Figler | 364/466 X |
| 4,413,739 | 11/1983 | Kohashi | 364/567 X |
| 4,419,734 | 12/1983 | Wolfson et al. | 364/567 |

Primary Examiner—Jerry Smith
Assistant Examiner—Gary V. Harkcom
Attorney, Agent, or Firm—Leitner & Martin

[57] ABSTRACT

A measurement and control system including a digital computer, a digital to analog converter for providing an analog data signal from digital data from the computer, a command sample and hold for holding the data analog signal as a control command signal, a measure sample and hold for holding an analog input signal indicative of a preselected variable, a measure comparator for comparing a series of analog outputs of the digital to analog with the held analog input and providing the comparison to the computer which calculates a measurement of the variable as a function of the comparisons. The output of the command sample and hold may be the system output or a command comparator may compare the output of the command sample and hold and the analog input to provide a system output signal.

13 Claims, 7 Drawing Figures

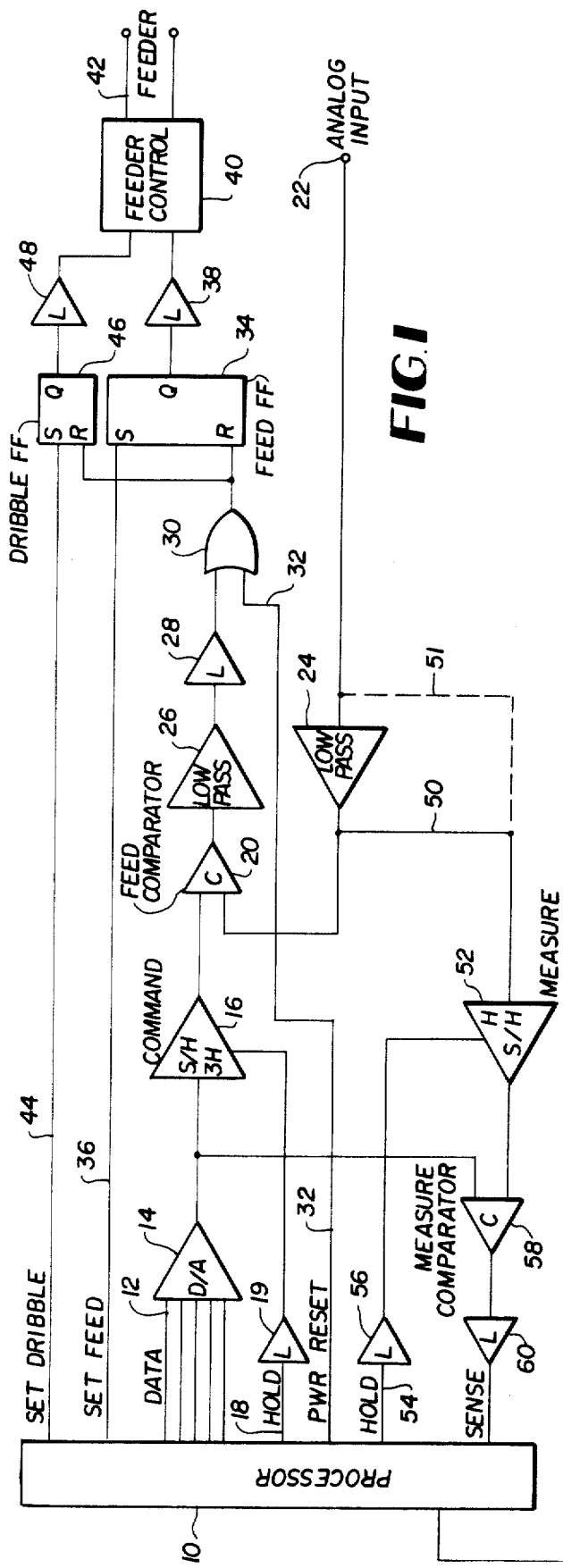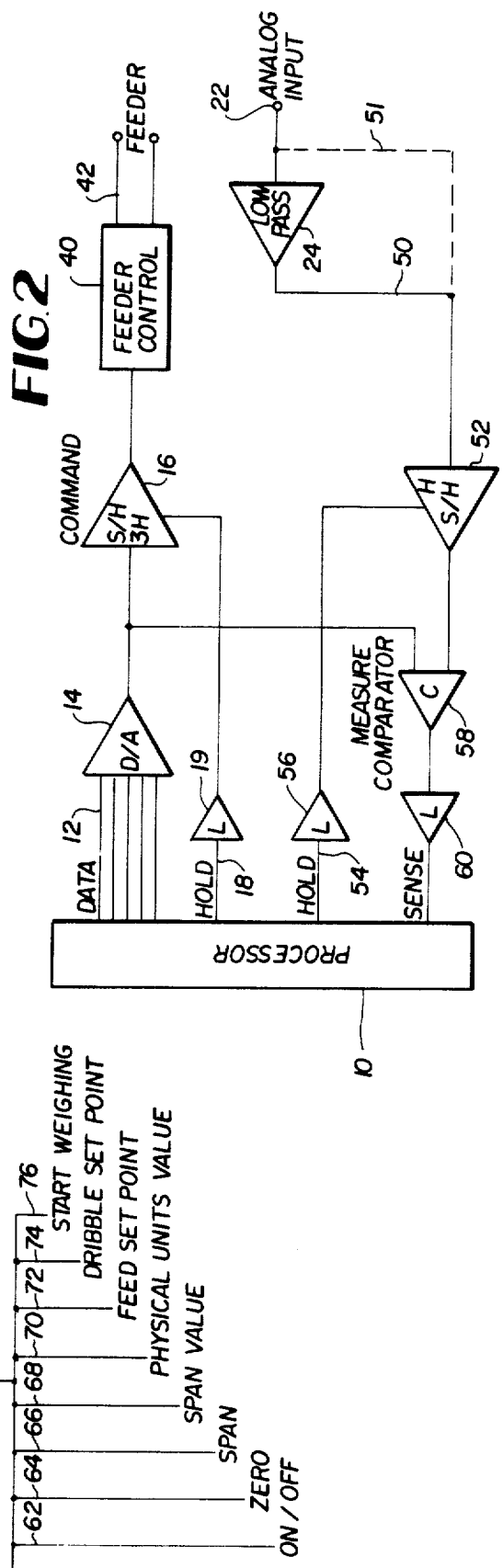

HYBRID DIGITAL-ANALOG MEASUREMENT AND CONTROL SYSTEM

BACKGROUND OF THE INVENTION

The present invention relates generally to digital systems for controlling analog processes and more specifically to an improved hybrid system of a digital-analog control of an analog process.

Analog processes, for example weighing systems, as exemplified by U.S. Pat. No. 4,111,336 to Ward et al. include a control system having a digital command signal converted by a digital to analog converter to an analog signal to be used in the control system with an analog weight signal to control the process. The analog weight signal is also converted to a digital signal by an analog to digital converter to be used to create the original digital command signal. These systems generally include a closed loop including a digital to analog converter to create a command valve and an analog to digital converter to provide a measurement signal back to the digital portion of the system. These systems must connect with the errors produced by the lack of tracking of the digital to analog converter and the analog to digital converter. They will both have independent drift and independent gain temperature coefficients. Thus, there is inherent error in the control and measurement loop.

Even the more sophisticated systems using a microprocessor as illustrated in U.S. Pat. No. 4,054,784 to Ricciardi still provide a digital to analog converter at the output of the microprocessor to provide analog control signals for the motor and uses an analog to digital converter in the feedback loop to provide measured or sensed conditions of the process back to the microprocessor. The problems produced by the lack of tracking of the digital to analog converter and the analog to digital converter is the same as that for the previously mentioned Ward et al. patent. The Ricciardi patent also includes the microprocessor continuously in the measurement and control loop. This preoccupies the microprocessor and is an inefficient use of its time.

Thus, there exists a need for a hybrid control system which takes full advantage of digital and analog systems while minimizing component errors.

SUMMARY OF THE INVENTION

An object of the present invention is to provide a hybrid digital-analog system which makes full use of both digital and analog elements.

Another object of the present invention is to provide a hybrid digital-analog control system which minimizes the component errors.

Still another object of the present invention is to provide a hybrid digital-analog control and measurement system which makes maximum use of the digital portion of the system.

An even further object of the present invention is to provide a more efficient and cost-effective hybrid digital-analog control and measurement system.

A still even further object of the present invention is to provide a hybrid digital-analog control circuit which alleviates the problem of droop in sample and hold elements.

An even further object of the present invention is to provide a weight control and measurement system which is capable of batch and continuous weight control.

These and other objects of the invention are attained by a hybrid digital-analog system wherein a digital computer provides digital data signals to a digital to analog converter which converts the digital data signals into an analog data signal and provides the same to a command sample and hold and to a measurement comparator. The analog command signal is used to command a response by a system which determines the value of the preselected variable and may include a command comparator which compares the analog command signal with an input analog signal representing a measurement of the preselected variable. The output of the command comparator provides the control signal for batch control. Alternatively, the analog output of the command sample and hold may be provided directly as the control signal for continuous weight control. The analog input signal is also provided to a measurement sample and hold whose output is compared at the measurement comparator with the output of the digital to analog converter. The output of the measurement comparator is provided back to the computer. The sample and holds are controlled by control signals from the digital computer. While the command sample and hold provides a command analog signal, the digital computer performs the measurement function using the signal from the measurement sample and hold. The digital computer provides a plurality of digital data signals until the measurement comparator indicates a match between the measure sample and hold and the output of the digital to analog converter. Thus, the hybrid system provides an analog control loop while the digital portion performs a measurement function eliminating the need for an analog to digital converter.

The measurement portion of the hybrid system is used to measure an analog signal representing a zero value with a preselected variable for use in subsequent compensation of digital calculations. Thus, the digital portion of the system provides zero offset and span corrections in lieu of trimming pots. Also the digital computer by continuously updating the control of the sample and hold prevents the problem of droop of the sample and hold value.

Other objects, advantages and features of the present invention will become apparent from the following detailed description of the preferred embodiments when considered in conjunction with the accompanying drawings.

BRIEF DESCRIPTION OF THE DRAWINGS

FIG. 1 is a block diagram of a hybrid digital-analog control and measurement system incorporating the principles of the present invention.

FIG. 2 is another embodiment of a hybrid control and measurement system incorporating the principles of the present invention.

DESCRIPTION OF THE PREFERRED EMBODIMENTS

Figure 3:
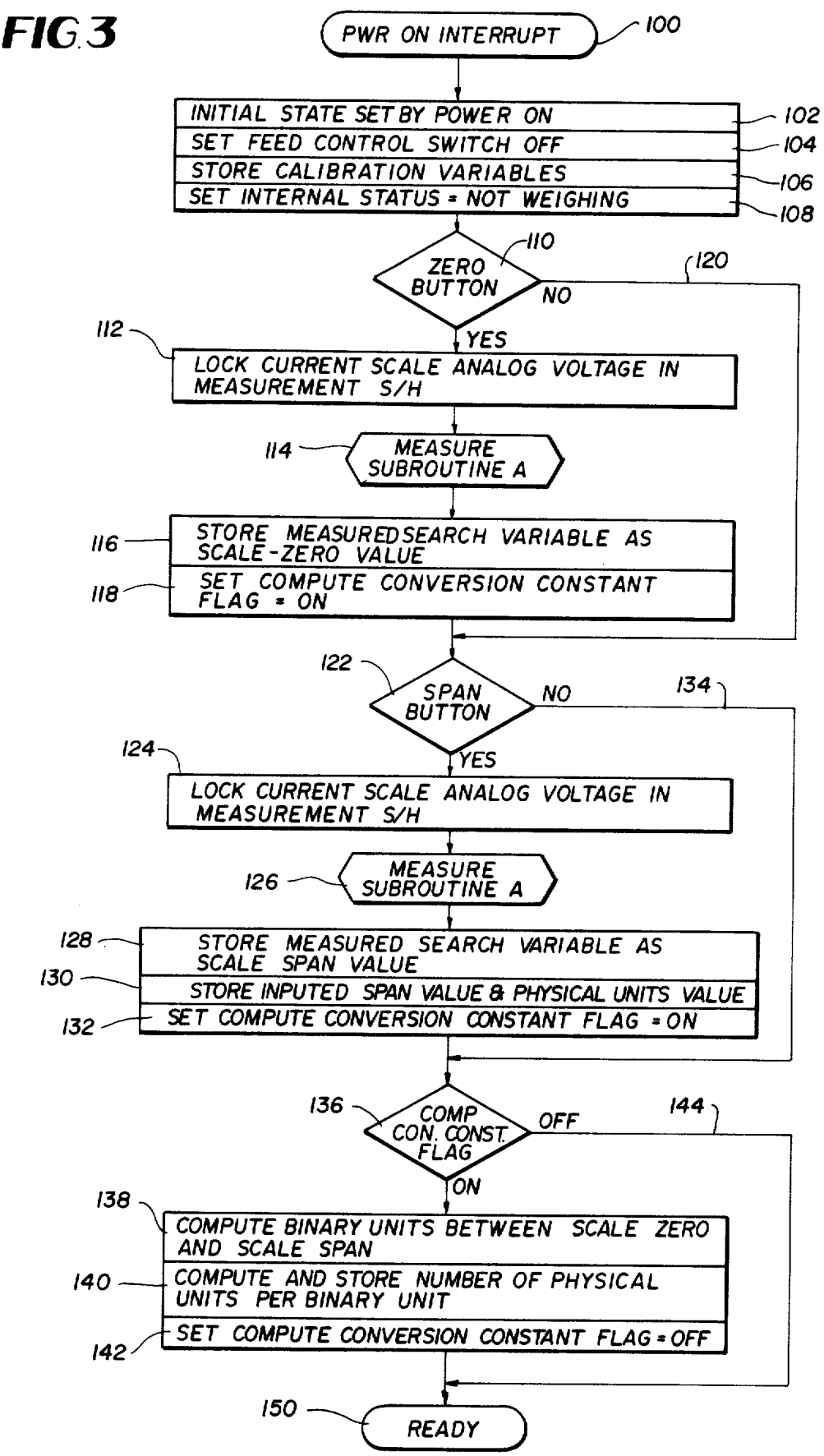
FIG. 3 is a flow diagram of the initialization operation of the program of the digital computer incorporating the principles of the present invention.

The measurement and control system of the present invention will be described in the environment of material feeding and weighing although it is applicable to other environments using a digital computer and analog elements to control and measure a process variable. An illustrated in FIG. 1, the control and measure system includes a microcomputer or microprocessor 10 providing digital data over bus 12 to a digital to analog converter 14. The analog data signal from the digital to analog converter 14 is provided to a command sample and hold 16 whose output is connected to a control or feed comparator 20. The microprocessor 10 provides a hold control signal to the command sample and hold 16 over line 18 and amplifier 19. The other input to the feed comparator 20 is from the analog signal input 22 through low pass filter 24. The output of the feed comparator 20 is provided through low pass filter 26 and amplifier 28 to an OR gate 30 whose other input 32 is from a power up reset signal from the microprocessor 10. The output of the OR gate 30 is provided to the reset terminal of feed flip-flop 34. The microprocessor provides a control signal SET FEED over line 36 to the set terminal of feed flip-flop 34. The Q output of feed flip-flop 34 is provided as a fast feed signal through amplifier 38 to the feeder control 40 whose output is provided to a feeder over lines 42. The output of the OR gate 30 is also provided to the reset terminal of dribble flip-flop 46 which also receives a SET DRIBBLE signal via line 44 to its set terminal. The Q output of dribble flip-flop 46 is provided as a slow feed signal through amplifier 48 to the feeder control 40. The feeder control 40 is not part of the present invention and thus will not be described in detail. Any feed control which is capable of feeding at two different rates depending upon whether it receives a fast speed signal from the feed flip-flop 34 or a slow speed signal from the dribble flip-flop 46.

The control portion of the system just described begins its operation by resetting both the flip-flops 34 and 46 from the power start up reset of terminal 32 of the OR gate 30. Once the operator has indicated to the microprocessor that it is ready to start weighing, a weight target is provided as digital data over data bus 12 to digital to analog converter 14. The analog data signal from digital to analog converter 14 is sampled and held in command sample and hold 16 under the control of line 18. The command analog signal from sample and hold 16 is provided to the feed comparator 20 wherein it is compared with the analog input signal from a scale. The feed or control comparator 20 provides no output as long as the analog input signal is less than the analog command signal. Previously, the microprocessor 10 has provided a SET FEED signal on line 36 to set the feed flip-flop 34 such that the Q output is high and the feed control 40 is turned on. As material is fed into the scale the analog input on port 22 rises. Once the analog input on port 22 equals or is greater than the analog command signal, the feed comparator 20 provides a high digital signal through low pass filter 26, amplifier 28 or OR gate 30 to reset feed flip-flop 34. This deactivates the feed controller 40.

Depending upon the measured value of weight which will be explained later, the microprocessor 10 may activate the dribble flip-flop 46 via SET DRIBBLE line 44 and provide a new target via the digital data bus 12, digital to analog converter 14, and sample hold 16 to the feed comparator 20. The dribble flip-flop 46 operates in the same manner as feed flip-flop 34 to provide a control signal to feeder control 40 to operate at a dribble or slower speed until the new target is reached. It should be noted that since the feed flip-flop 34 and the dribble flip-flop 46 have separate set control signals from the microprocessor 10 only one of the two may be operational at one time. The low pass filter 26, amplifier 28, OR gate 30, flip-flops 34 and 46, and amplifiers 38 and 48 are merely examples of a logic capable of generating the dual speed control signal and other logic may be used without departing from the present invention.

As is evident from the above description, the microprocessor or digital computer provide a command digital signal which is used in an analog loop to control the process which determines the weight. It should be noted that in order to prevent droop of the signal in the command sample and hold 16, the digital computer will refresh the command signal in sample and hold 16 periodically.

The measurement portion of the present system includes a measure sample and hold 52 which receives the analog input from port 22 via low pass filter 24 and line 50. It should be noted that if the low pass filter 24 is not needed in the measurement loop, it may be bypassed as illustrated by the dash line 51. The measure sample and hold 52 receives a hold signal from the microprocessor 10 via line 54 and amplifier 56. The output of the measure sample and hold 52 is provided to a measure comparator 58 with the analog output of the digital to analog converter 14. The output of the measure comparator 58 is provided to the microprocessor 10 via amplifier 60. The microprocessor as will be explained more fully below provides a plurality of digital data signals via bus 12 to digital to analog converter 14 until the measure comparator 58 indicates a match of the analog data signal with the analog input signal held in measure sample and hold 52. One method which may be used by the microcomputer would be a successive approximation using a binary search.

Thus, in effect the microcomputer performs the analog to digital conversion of the analog input on input terminal 22. Since the command sample and hold 16 maintains the target value of the variable or weight, the microprocessor 10 can disassociate itself from the control loop so as to perform the measuring function of the analog signal while the analog portion of the control loop performs the control function.

Although FIG. 1 describes the present invention for a batch type feeder wherein a fixed amount of material is to be fed into a hopper, a bag or other receptacle, the present system is also applicable to a continuous weighing or weight out or loss of weight system. In this system the feed rate of material into the receptacle is adjusted to maintain a fixed profile of weight loss from the receptacle. The modification of the measure and control circuit of FIG. 1 is illustrated in FIG. 2. The major modification is in the control circuit with no modification in the measurement circuitry and may be accomplished by an external switch which bypasses elements 20, 26, 28, 30, 34 and 38 and modifying the computer program.

The control circuit receives the digital data over bus 12 to the digital to analog converter 14. The analog signal 14 is held in command sample and hold 16 and is provided to the control feeder 40 which provides an output signal 42 to the feeder. In the system of FIG. 2, the digital data on bus 12 and the analog signal provided to command sample and hold 16 is a feed rate signal and not a weight signal as in the control circuit of FIG. 1. Although the system of FIG. 2 does not provide an analog control loop, the command sample and hold 16 provides the analog control signal while allowing the microprocessor 10 and digital to analog converter 14 to be used in the measurement loop. Thus, the microprocessor can still perform the analog to digital conversion and eliminate the need of this element.

In addition to the normal inputs into the microcomputer, the inputs illustrated in FIG. 1 include an on-off switch 62, zero switch 64, span switch 66, and start weighing switch 76. Data inputs include thumb wheels or other types of input devices may include span value at 68, physical units value at 70, feed set point at 72 and dribble set point aT 74. These are merely examples of various inputs that may be provided and are those to be described in the flow charts of FIGS. 3-7.

Although microprocessor 10 has been illustrated with a single feed control 40, it is evident that the microprocessor 10 is capable with a group of circuit elements shown for controlling a plurality of feed controls 40 and measuring a plurality of scales. This would make the system highly applicable to multiple ingredient dispensing. The microprocessor would easily perform the control function by multiple command sample and holds 16 and would possibly use a multiplexing technique for the multiple measurement portions of each of the measurement systems.

The following is a description of the flow charts of a program illustrated in FIGS. 3-7 which is an example of the program capable of operating the control and measurement system illustrated in FIGS. 1 and 2. The program begins as illustrated in FIG. 3 with a power ON interrupt at 100. The initial state is set by the power ON in block 102 followed by setting the feed control switch off at 104. This produces the power up reset on line 32 of FIG. 1. The calibration variables are stored as indicated by block 106 and the internal status is set to not weighing at block 108.

The condition of the zero button or switch 64 is determined at block 110. If the button is pressed, the calibration for the zero set is performed. This begins by locking the current scale analog voltage on analog input 22 in the measure sample and hold 52 as indicated in block 112. The measure subroutine A is then performed as indicated by block 114. Once the measure subroutine A is completed the measured search variable is stored as the scale zero value in block 116. Thus if the analog signal which represents a scale zero is calculated and stored in the computer, the computer will use this value to calculate a zero offset to be used in future calculations. This alleviates the need for the operator to zero the scale reading using trimming resistors or pots. This increases the accuracy of the system since the adjustment is a computer versus operator controlled. The zero calibration is then completed in block 118 by setting the computer conversion constant flag equal to on.

Once the zero calibration has been completed or if the zero button was not pressed as indicated by line 120, the span button or switch 66 is then monitored at block 122. If this scan button is pressed a scan calibration is then performed. A known weight is placed on the scale and the current analog scale signal on analog input 22 representing the known weight is locked into the measure sample on hold 52 as illustrated in block 124. The measure subroutine A is then entered to calculate the digital value for the analog signal locked in the measure sample and hold 52 as illustrated by block 126. The resulting search variable from the measure subroutine A is then stored as the scale span value as indicated by block 128. The inputted span value and physical unit values from inputs 68 and 70 are then stored as indicated by block 130. The stored zero scale value and span value are used as two points to define a line to which the featured measured values are to be compared and appropriately proportioned. The physical unit values convert the digital measured value to a display value. The physical unit value may be, for example pounds, grams or any other desired value. The compute conversion constant flag is set on in block 132 and the span calibration portion is complete.

From the completion of the span calibration or if the span button was not pressed as indicated by line 134 the state of the compute conversion constant flag is sensed at 136. If the flag is on, the binary units between scale zero and scale span is computed in block 138. The number of physical units per binary units is computed and stored in block 140 and finally the computer conversion constant flag is set to off since the computation is complete. Once this operation is complete or if the compute conversion constant flag was off as indicated by line 134, the ready portion of the program 150 is entered and is described in FIG. 4.

Figure 4:
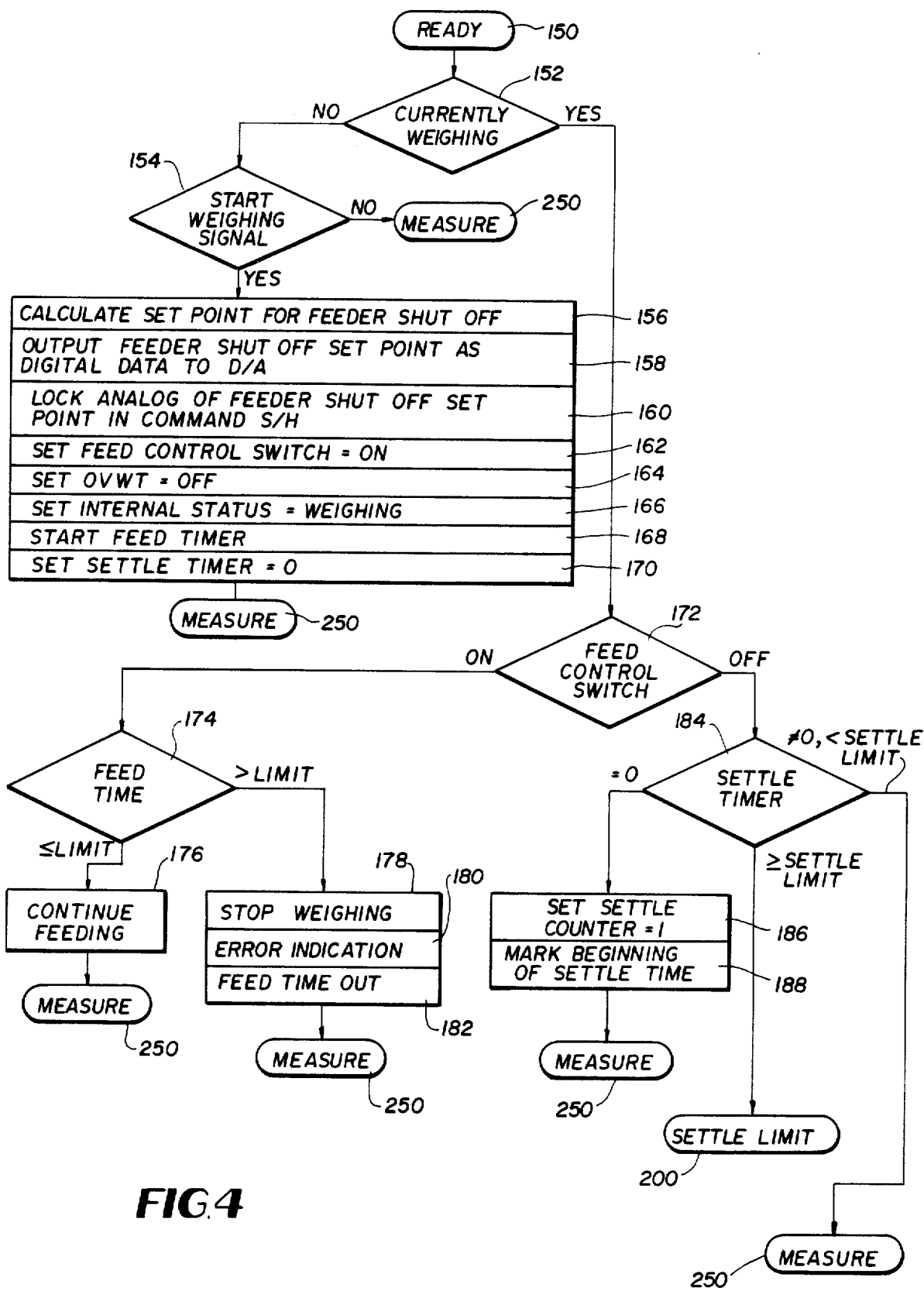
FIG. 4 is a flow diagram of the control portion of the program for the digital computer incorporating the principles of the present invention.

The operational part of the program starts up the ready 150 in FIG. 4 and the internal status is checked at 152 to determine whether the internal status is weighing or not. If the status is not weighing, the start weighing signal from input 76 is monitored at 154. If the start weighing signal is not present, the measure portion of the program is entered at 250. If the start weighing signal is present, the program calculates the set point for the feeder shutoff at 156 from the feed set point provided as an input at input terminal 72. The calculated feed set point is converted to a binary digital data and provided to the digital-analog converter 14. The analog feed set point is locked into command sample and hold 16 by control signal provided on line 18 as indicated in block 160. The set feed control switch is set ON and a signal is transmitted over line 36 to set the feed flip-flop 34 as indicated in block 162, the overweight (OVWT) switch is set to OFF in 164, the internal status is set to weighing at 166, the feed timer is started at 168, and the settle timer is set to zero in 170. This sequence is terminated by entering the measure portion of the program at 250.

If the program internal status checked at 152 is weighing, the program then checks at 172 the feed to control switch. If the feed control switch is ON the feed timer is checked at 174. If the timer is equal to or below the feed time limit, the feeding is continued to 176 and the measure part of the program is entered at 250. If the feed time is greater than the limit the weighing is stopped at 178, error indications are set by 180 and the feed timer is timed out at 182 terminating with entering the measure portion at 250.

If the feed control switch 172 is in the OFF position, indicating that a feeding has terminated, the settle timer is checked at 184. If the settle timer is equal to zero, the settle counter is set equal to one at 186, the beginning of the settle time is marked at 188 and the measure phase is entered at 250. If the settle time is not equal to zero or less than the settle time limit, the measure phase is entered directly at 250. If the settle time is equal to or greater than the settle limit, the settle limit portion of the program is entered at 200.

Figure 5:
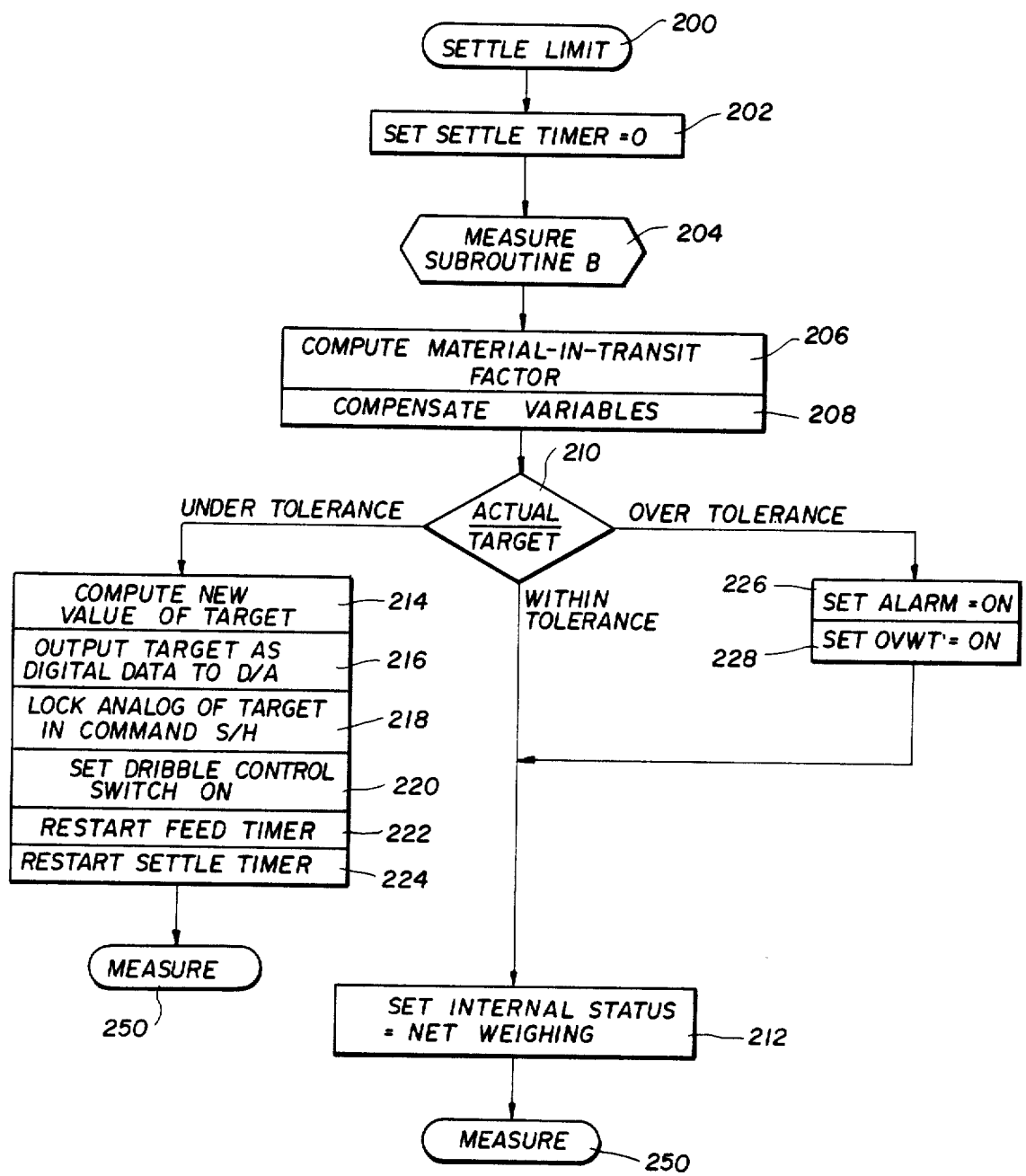
FIG. 5 is a flow diagram of the settle portion of the program for the digital computer incorporating the principles of the present invention.

As illustrated in FIG. 5, the settle limit portion of the program begins at 200 and the settle timer is set to zero at 202. The measure subroutine B is entered at 204. Upon return from the measure subroutine B, the material in transit factor is calculated at 206 and the measured weight or search variable from the measured subroutine B is compensated for material-in-transit factor as well as other prestored factors which are characteristic of the mechanical system. The compensated search variable is compared against the target value at 210. If the actual or compensated search variable is within tolerances, the internal status is set to nonweighing at 212 and the measure portion of the program is entered at 250.

If the actual compensated variable 210 is under tolerance relative to the target a new value for the target is calculated at 214. The new target is provided as digital data over bus 12 to digital to analog converter 14 and the analog output of the digital to analog converter 14 is locked into the command sample and hold 16 by a control signal or line 18 as indicated in block 218. The dribble control switch is set ON and a set dribble signal is provided over line 44 to the dribbler flip-flop 46 as indicated in block 220. The feeder time is reset at 222 and the settle timer is restarted at 224. This terminates with entering the measure portion of the program at 250. If the compensated search value is over tolerance relative to the target value as determined at 210, the alarm switch is set on at 226 and the overweight switch is set ON at 228. The program then sets the internal status to not weighing at 212 and enters the measure portion of the program at 250.

Figure 6:
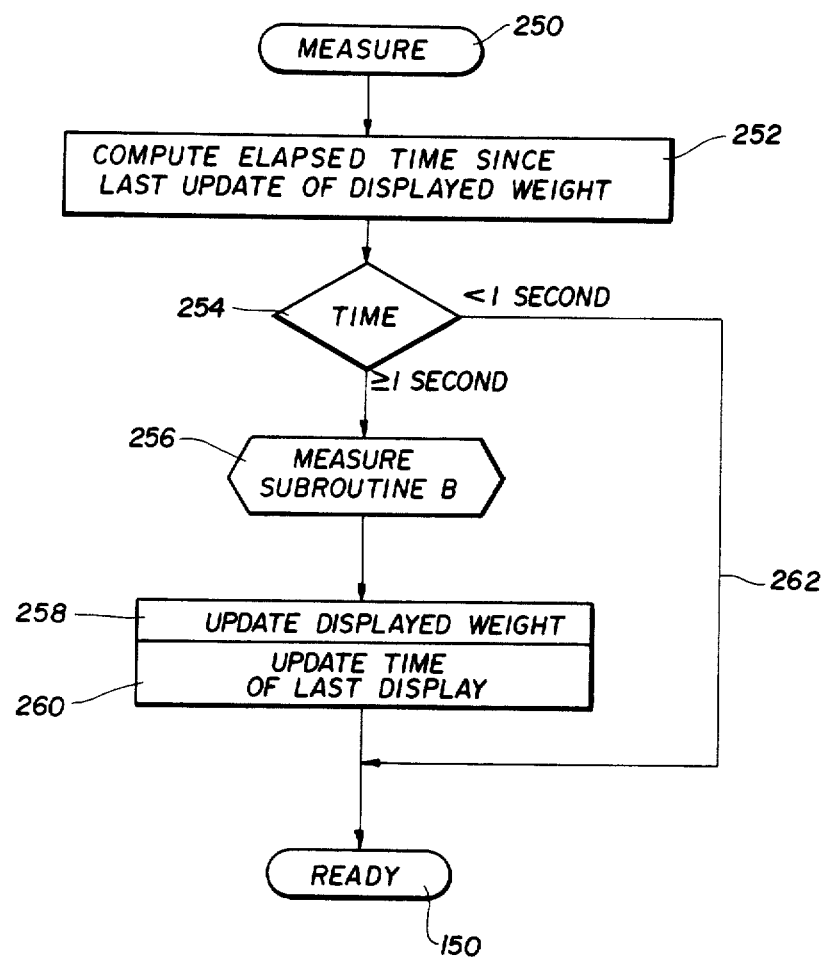
FIG. 6 is a block diagram of the measurement portion of the program for the digital computer incorporating the principles of the present invention.

The measure portion of the program beginning with 250 is illustrated in FIG. 6 wherein the elapsed time since the last update of the displayed weight is computed at 252. This computed time is then sensed at 254 to determine whether it is above or below a preselected number which as illustrated is one second. If the time at 254 is greater than or equal to one second. The measure subroutine B is entered at 256 and the results of the subroutine updates the displayed weight at 258 and updates the times since the last display at 260. The program then goes back to the ready portion 150 of FIG. 4. If the time since the last update display is less than one second, the program automatically goes back to the ready 150 as indicated by line 262.

Figure 7:
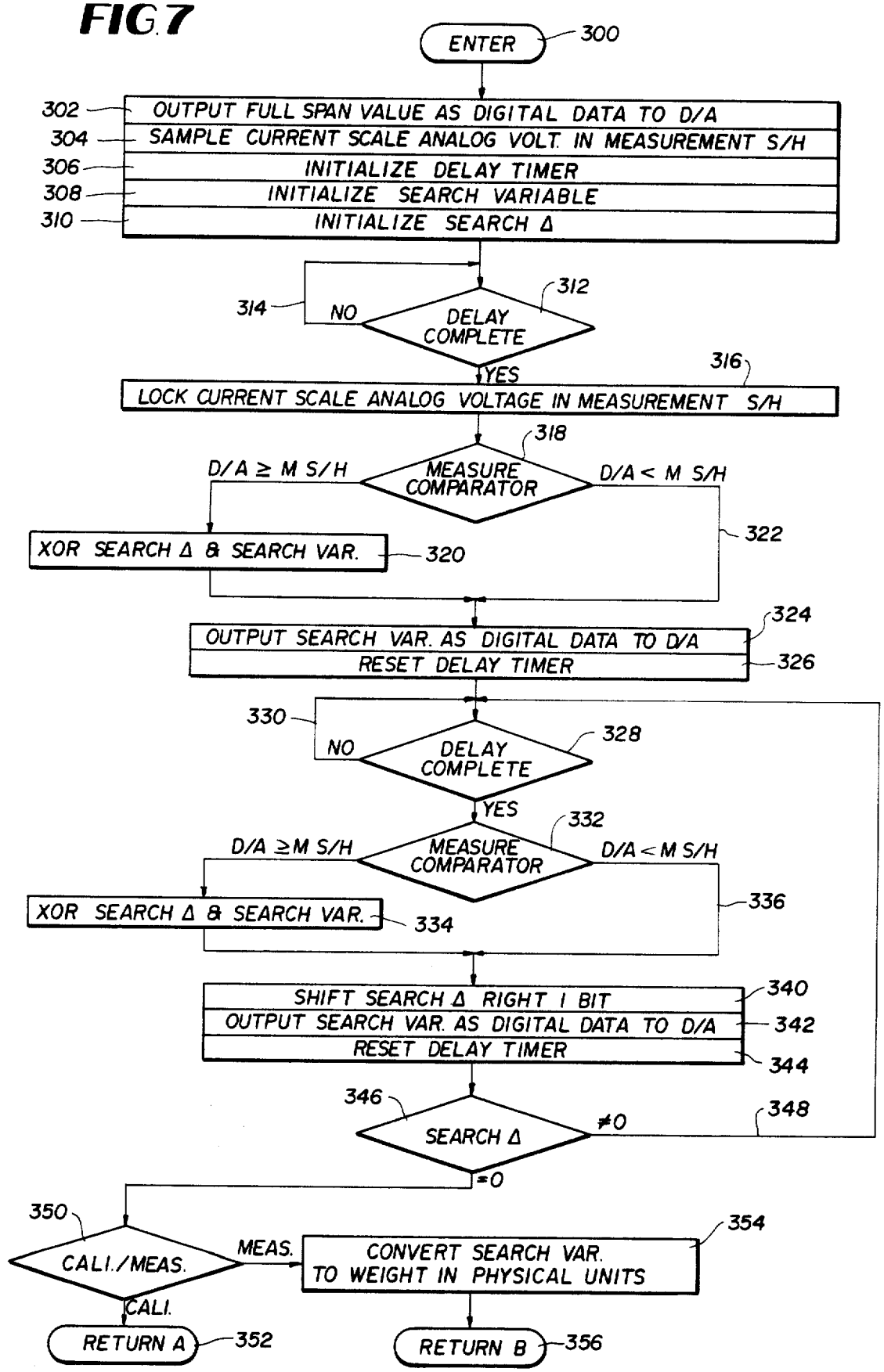
FIG. 7 is a flow diagram of the measurement subroutine for the digital computer incorporating the principles of the present invention.

The measure subroutine illustrated in FIG. 7 is but one of many routines which is capable of performing the measurement of the variable. The routine is entered at 300 and the full scan value calculated and stored in block 128 of FIG. 3 is outputted as digital data to the digital to analog converter 14 as indicated in block 302. The analog voltage on the analog input 22 is sampled by the measure sample and hold 52 as indicated by block 304. The delay timer is initialized at 306, the search variable is initialized at 308 and the search delta is initialized at 310. The completion of the delay is sensed at 312, and if it is not complete it continues to cycle as indicated by line 314. If the delay is complete, the current analog voltage on the analog input 22 is locked in the measure sample and hold 52 by a control signal over line 54.

The output signal of the measure comparator 58 is monitored at 318. If the data signal from digital to analog converter 14 is greater than or equal to the measure sample and hold 52's signal, the initialized search delta is exclusively ORed with the search variable at 320. If the signal from the digital analog converter 14 is less than the measure sample and hold 52's signal, the search variable is not modified as indicated by line 322. Next the search variable modified or unmodified is provided as digital data to the digital to analog converter 14 as indicated in block 324. The delay timer is reset at 326 and then monitored at 328 to determine whether the delay is complete or not. If it is not complete, it recycles as indicated by line 330 until the delay is complete.

Upon the completion of the delay, the measure comparator 58 is again monitored at 322 to determine whether the analog signal from the digital to analog converter 14 is greater than or equal to the analog signal of the measure sample and hold 52. If it is, the search variable is exclusively ORed with this search delta at 334. If it is not, the search variable itself is used as indicated by line 336. The search delta is then shifted right one bit as indicated in 340 which results in basically cutting the search variable in half. The new search variable is outputted to the digital to analog converter 14 as digital data at 342 and the delay time is reset at 344. The search delta is then monitored at 346 to determine whether it is zero or not. If it is not zero the program loops back to block 32B where the delay timer completion is monitored. The program continues to loop via 348 until the search delta is equal to zero.

Once it determines that the search delta is zero, the program determines whether it is in a calibration or a measure mode at 350. If it is in a calibration mode, the program returns at 352 with a measured search variable to blocks 114 or 126 of the calibration or the initialization program of FIG. 3. If it is in a measure mode from the measure program of FIG. 6, it then converts measure variable into a weight in physical units in 354 and returns at 356 to block 256 of FIG. 6.

The delay counter and the monitoring of the delay in blocks 312 and 328 allows the digital to analog converter 14 to provide a settled result as well as to allow the sample and hold measure 52 to provide a settled or stabled result. This reduces the amount of possible error which would be introduced in the measurement loop.

Although the control and measurement system of FIGS. 1 and 2 have been described relative to a weighing system, it should be noted that it is applicable to other control environments. The output of the command sample and hold 16 may be a command analog signal which may be used to directly control a system or element which determines the value of the preselected variable which is to be measured as illustrated in FIG. 2 or may be provided with a comparator 20 which provides a digital ON-OFF signal to the system which controls the preselected variable. The analog input at 22 is an analog signal indicative of the preselected variable and may be used in an analog control loop with comparator 20 as shown in FIG. 1. In any instance, the measurement of the preselected variable as indicated by the input signal on analog input 22 is measured or converted to a digital value using the computer in the digital to analog conversion loop including sample and hold 52, comparator 58 and digital to analog converter 14.

Although the present invention has been described and illustrated in detail, it is to be clearly understood that the same is by way of example and illustration only and is not to be taken by way of limitation. The spirit and scope of the present invention are to be limited only by the terms of the appended claims.

What is claimed is:

1. A hybrid control system for controlling an analog signal responsive means which means determines by such response the value of a preselected variable in the form of an analog input signal, comprising:
   a programmed digital computer means for producing digital data signals and a plurality of control signals;
   a digital to analog converter means for receiving said digital data signals and providing an analog data signal output;
   a first sample and hold means coupled to receive the analog data signals and responsively coupled to the digital computer means for receiving one of said control signals for sampling and holding said analog data signal in response to said one control signal as an analog command signal, said analog signal responsive means being responsively coupled to the command signal to determine the value of the preselected variable;
   an analog input port means coupled for receiving the analog input signal representing a measurement of said preselected variable;
   a second sample and hold means coupled to receive the analog input signal and responsively coupled to the digital computer means to receive another of said control signals for sampling and holding said analog input signal in accordance with said another control signal as a measurement signal; and
   measurement comparator means responsively coupled to receive and compare said measurement signal from said second sample and hold means and said analog data signal from said digital to analog converter means and for providing a comparison signal to an input of said digital computer means as a function of the comparison.

2. The hybrid control system according to claim 1 wherein said digital computer means controls said first sample and hold means to hold a first analog data signal, controls said second sample and hold means to hold a first analog input signal, and determines the measured variable by providing a plurality of digital data signals to said digital to analog converter means until said comparison signal indicates a match.

3. The hybrid control system according to claim 2 including a command comparator means responsive for comparing said analog input signal from said analog input port means and said analog command signal from said first sample and hold means and for providing an output control signal for the analog signal responsive means which determines the value of said preselected variable as a function of the comparison.

4. The hybrid control system according to claim 3 wherein said command comparator means provides a digital output control signal as a function of said comparison.

5. The hybrid control system according to claim 1 including a command comparator means for comparing said analog input signal from said analog input port means and said analog command signal from said first sample and hold means and for providing an output control signal for the analog signal responsive means which determines the value of said preselected variable as a function of the comparison.

6. The hybrid control system according to claim 1 wherein said digital computer means controls said second sample and hold means to hold first an analog signal representing a zero value for said preselected variable and second an analog signal representing a predetermined value of said preselected variable and said digital computer means determines digital values first for said zero value and second for said predetermined value by providing a plurality of digital data signals to said digital to analog converter means until said measurement comparator means indicates a match and stores said digital values for subsequent compensation of digital calculations.

7. In a weight control system having a feeder for feeding material, a weight measurement and feed control system for said feeder comprising:
   a programmed digital computer means for producing digital data signals and a plurality of control signals;
   a digital to analog converter means for receiving said digital data signals and providing an analog data signal;
   a first sample and hold means coupled to receive the analog data signal and responsively coupled to the digital computer means for receiving one of the control signals for sampling and holding said analog data signal in accordance with said one control signal said first sample and hold means producing an analog command signal representing a command feed rate, said feeder responsive to said command signal to operate at said command rate;
   an analog input port means coupled to receive an analog input weight signal;
   a second sample and hold means coupled to receive the analog input signal responsive to the digital computer means to receive another of said control signals for sampling and holding said analog input weight signal as determined by said another control signal as a measurement signal; and
   measurement comparator means responsively coupled to receive and compare said measurement signal from said second sample and hold means and said analog weight data signal from said digital to analog converter means and for providing a comparison signal to said digital computer means as a function of the comparison.

8. The weight control system according to claim 7 wherein said digital computer means controls said first sample and hold means to hold a first analog data signal, controls said second sample and hold means to hold a first analog input signal, and determines the weight by providing a plurality of digital data signals to said digital to analog converter means until said comparison signal indicates a match.

9. The weight control system according to claim 7 wherein said digital computer means controls said second sample and hold means to hold first and analog weight signal representing a zero value for weight and second an analog weight signal representing a predetermined value of weight, and said digital computer means determines digital values first for said zero value and second for said predetermined value by providing a plurality of digital data signals to said digital to analog converter means until said comparison means indicates a match and stores said digital values for subsequent compensation of digital calculations.

10. In a weight control system having a feeder and a measurement and control system for said feeder, comprising:
- a programmed digital computer means for producing digital data signal and a plurality of control signals;
- a digital to analog converter means for receiving said digital data signals and providing an analog data signal output;
- a first sample and hold means coupled to receive the analog data signals and responsively coupled to the digital computer means for receiving one of the control signals for sampling and holding said analog data signal in accordance with said control signals as an analog weight command signal;
- an analog input port means coupled to receive an analog input weight signal;
- a command comparator means coupled to receive said analog input weight signal and said command weight signal for comparing said analog input weight signal from said analog input port and said analog command weight signal from said first sample and hold means and for providing an output control signal to said feeder as a function of the comparison;
- a second sample and hold means coupled to receive the analog input signal and responsive to the digital computer means to receive another of said control signals for sampling and holding said analog input weight signal in accordance with said another control signal as a measurement signal; and
- measurement comparator means responsively coupled to receive and compare said measurement signal from said second sample and hold means and said analog weight data signal from said digital to analog converter means and for providing a comparison signal to said digital computer means as a function of the comparison.

11. The weight control system according to claim 10 wherein said command comparator means provides a digital output control signal as a function of said comparison.

12. The weight control system according to claim 10 wherein said digital computer means controls said second sample and hold means to hold first an analog input weight signal representing a zero value and second an analog input weight signal representing a predetermined value of weight and said digital computer means determines digital values first for said zero value and second for said predetermined value by providing a plurality of digital data signals to said digital to analog converter means until said comparison means indicates a match and stores said digital values for subsequent compensation of digital calculations.

13. A hybrid control system for controlling an analog signal responsive means, which means determines by such response the value of a preselected variable in the form of a measured analog input signal comprising:
- a program digital computer means for producing digital data signal and at least one control signal;
- a digital to analog converter means for receiving said digital data signals and providing an analog data signal output;
- a sample and hold means coupled to receive the analog data signals and responsively coupled to the digital computer means for receiving at least one of said control signals for sampling and holding said analog data signal in response thereto as an analog command signal, said analog signal responsive means being responsive to the command signal to determine the value of the preselected variable;
- an analog input port means coupled for receiving the analog input signal representing a measurement of said preselected variable;
- and comparator means responsively coupled to receive and compare said analog input signal from said analog input port means and said command signal from said sample and hold means for operatively coupling the analog signal to the analog signal responsive means in a control loop external to the digital computer means.

* * * * *